US006835475B2

United States Patent
Carey et al.

(10) Patent No.: US 6,835,475 B2
(45) Date of Patent: Dec. 28, 2004

(54) DUAL-LAYER PERPENDICULAR MAGNETIC RECORDING MEDIA WITH LAMINATED UNDERLAYER FORMED WITH ANTIFERROMAGNETICALLY COUPLED FILMS

(75) Inventors: Matthew J. Carey, San Jose, CA (US); Yoshihiro Ikeda, San Jose, CA (US); Neil Smith, San Jose, CA (US); Kentaro Takano, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 155 days.

(21) Appl. No.: 09/916,390

(22) Filed: Jul. 26, 2001

(65) Prior Publication Data

US 2003/0022023 A1 Jan. 30, 2003

(51) Int. Cl.$^7$ .............................. G11B 5/66; G11B 5/70
(52) U.S. Cl. ...................... 428/694 TS; 428/694 TM; 428/212; 428/900
(58) Field of Search .................... 428/694 TM, 694 TS, 428/212, 900, 65.3

(56) References Cited

U.S. PATENT DOCUMENTS

| | | | | |
|---|---|---|---|---|
| 4,621,030 A | * | 11/1986 | Uesaka et al. | 428/607 |
| 4,842,917 A | * | 6/1989 | Ohno et al. | 428/141 |
| 4,964,242 A | * | 10/1990 | Ruble et al. | 51/144 |
| 5,861,220 A | * | 1/1999 | Coughlin | 428/694 TM |
| 6,197,439 B1 | | 3/2001 | Parkin et al. | 428/678 |
| 6,686,070 B1 | * | 2/2004 | Futamoto et al. | 428/694 TS |
| 2002/0028356 A1 | * | 3/2002 | Kawato et al. | 428/694 TM |
| 2002/0028357 A1 | * | 3/2002 | Shukh et al. | 428/694 TM |
| 2002/0127433 A1 | * | 9/2002 | Shimizu et al. | 428/694 TM |

OTHER PUBLICATIONS

N.R. Darragh et al., *Observation of Underlayer Domain Noise in Perpendicular Recording Disks*, IEEE Transactions on Magnetics, vol. 29, No. 6, Nov. 1993, pp. 3742–3744.

T. Ichihara et al., *Improvement of the Magnetic Characteristics of Multilayered Ni–Fe Thin Films by Applying External In–Plane Field During Sputtering*, IEEE Transactions on Magnetics, vol. 32, No.5, Sep. 1996, pp. 4582–4584.

S. Nakagawa et al., *Soft Magnetic and Crystallographic Properties of $Ni_{81}FE_{19}/Co_{67}CR_{33}$ Multilayers as Backlayers in Perpendicular Recording Media*, IEEE Transactions on Magnetics, vol. 30, No. 6, Nov. 1994, pp. 4020–4022.

* cited by examiner

Primary Examiner—Holly Rickman
(74) Attorney, Agent, or Firm—Thomas R. Berthold

(57) ABSTRACT

A dual-layer type perpendicular magnetic recording disk for use in a perpendicular magnetic recording system that uses a single pole recording head has a laminated underlayer that has at least two ferromagnetic films exchange-coupled across an antiferromagnetic coupling layer. The magnetic moments of the ferromagnetic layers in the laminated underlayer are oriented antiparallel. The laminated underlayer provides a soft magnetically permeable flux return path without undesirable domain walls and associated media noise, with controllable permeability and minimization of saturation of the upper ferromagnetic layers. In one embodiment the moments of the ferromagnetic layers in the underlayer are oriented generally radially on the disk. In another embodiment the moments are oriented generally circumferentially in the track direction on the disk, so that the beneficial effect of the soft magnetic underlayer occurs primarily only during the writing process.

22 Claims, 4 Drawing Sheets

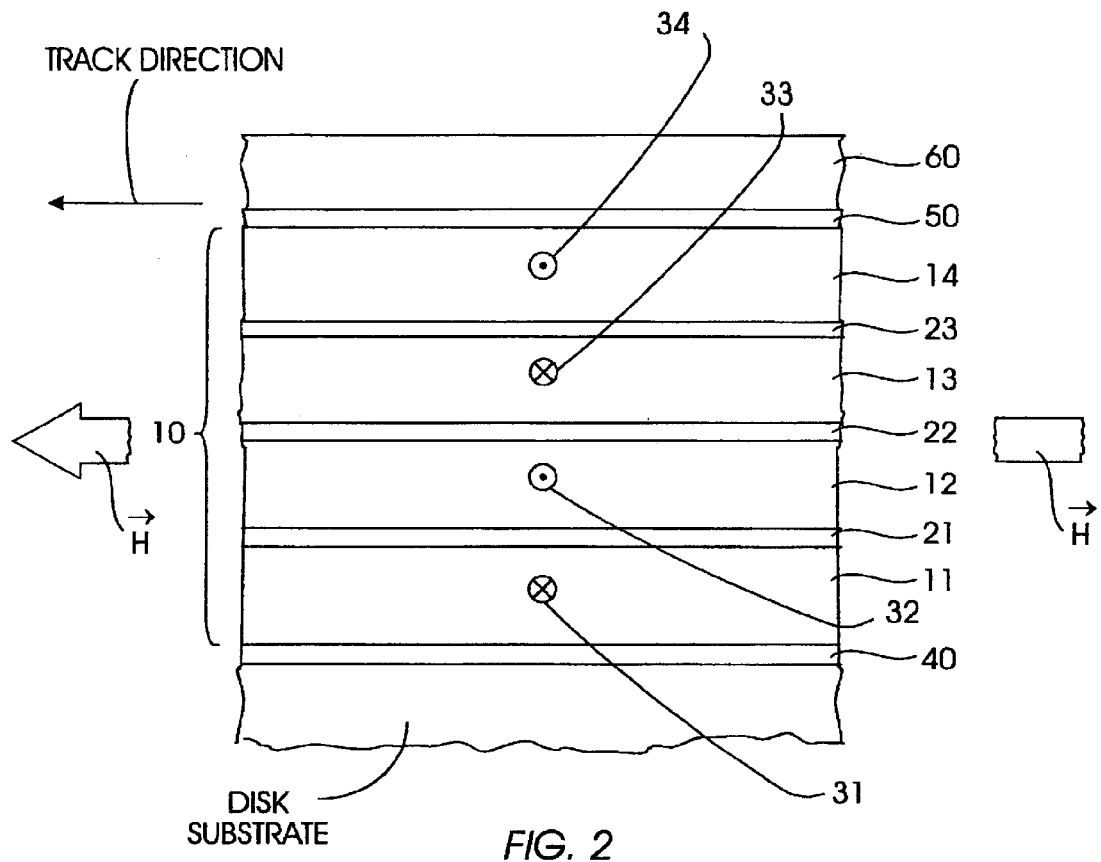
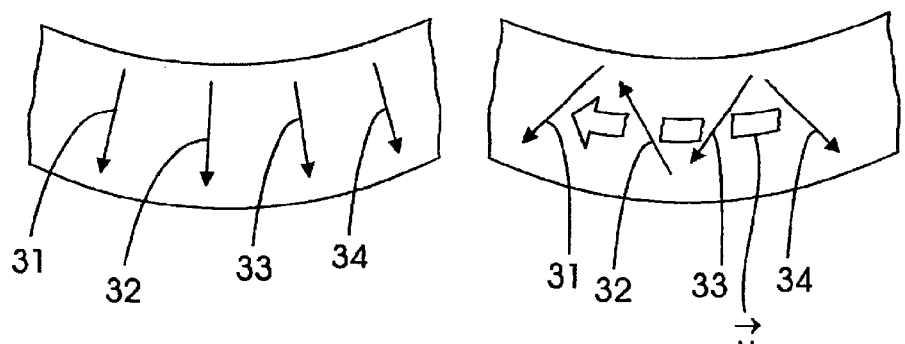

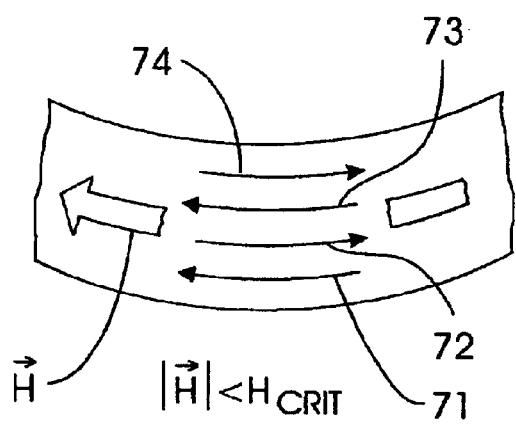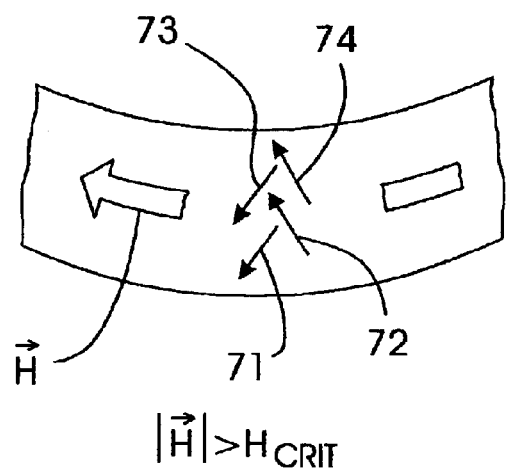
FIG. 5A
FIG. 5B

DUAL-LAYER PERPENDICULAR MAGNETIC RECORDING MEDIA WITH LAMINATED UNDERLAYER FORMED WITH ANTIFERROMAGNETICALLY COUPLED FILMS

TECHNICAL FIELD

This invention relates to a perpendicular magnetic recording disk for use in a perpendicular magnetic recording disk drive that uses a single pole head, and more particularly to an improved perpendicular magnetic recording disk with a laminated underlayer to provide a flux return path for the magnetic field from the head.

BACKGROUND OF THE INVENTION

Perpendicular magnetic recording has been suggested as a promising path toward ultra-high recording densities in magnetic recording rigid disk drives. The most common type of system is one that uses a "probe" or single pole recording head with a "dual-layer" media as the recording disk. The dual-layer media comprises a perpendicular magnetic data recording layer formed on a "soft" or relatively low-coercivity magnetically permeable underlayer, the underlayer serving as a flux return path for the field from the pole head. This type of system is also called "Type 1" perpendicular magnetic recording. A schematic of such a system with a read element for reading the recorded data is shown in FIG. 1.

It is desirable that the underlayer for dual-layer perpendicular recording media behave magnetically soft, and be devoid of domain walls. Magnetic "softness", in this instance, refers to the ability of the underlayer to carry magnetic flux directly in proportion to the in-plane magnetic fields driving that flux. To achieve magnetic softness without domain walls, it is desired, in the quiescent state, absent of recorded transitions and/or writing fields, that the underlayer be effectively in a "single-domain-state", whereby the magnetization in the underlayer is everywhere aligned in predominantly a single direction. The presence of multiple domains as a source of media noise in dual-layer perpendicular media has been reported by N. R. Darragh et al., "Observation of Underlayer Domain Noise in Perpendicular Recording Disks", IEEE TRANSACTIONS ON MAGNETICS, Vol. 29, No. 6, November 1993, pp. 3742–3744. To address the problem of media noise, multi-layered underlayers have been proposed that comprise multiple soft magnetic films separated by electrically conductive films, such as Al and CoCr. These multilayers are described in the following references: T. Ichihara et al., "Improvement of the Magnetic Characteristic of Multilayered Ni—Fe thin Films by Supplying External In-Plane Field during Sputtering", IEEE TRANSACTIONS ON MAGNETICS, Vol. 32, No. 5, September 1996, pp. 4582–4584; and S. Nakagawa et al., "Soft Magnetic and Crystallographic Properties of $Ni_{81}Fe_{19}/Co_{67}Cr_{33}$ Multilayers as Backlayers in Perpendicular Recording Media", IEEE TRANSACTIONS ON MAGNETICS, Vol. 30, No. 4, 1994, pp. 4020–4022.

What is needed is an improved dual-layer type perpendicular magnetic recording disk with an underlayer that results in less media noise.

SUMMARY OF THE INVENTION

The present invention is a dual-layer type perpendicular magnetic recording disk for use in a perpendicular magnetic recording system that uses a single pole recording head. The underlayer portion of the dual-layer disk is a laminated underlayer that has at least two ferromagnetic films exchange-coupled across an antiferromagnetic coupling layer. The magnetic moments of the ferromagnetic layers in the laminated underlayer are oriented antiparallel. The laminated underlayer provides a soft magnetically permeable flux return path without undesirable domain walls and associated media noise, with controllable permeability and minimization of saturation of the upper ferromagnetic layers. In one embodiment the moments of the ferromagnetic layers in the underlayer are oriented generally radially on the disk. In another embodiment the moments are oriented generally circumferentially in the track direction on the disk, so that the beneficial effect of the soft magnetic underlayer occurs primarily only during the writing process.

For a fuller understanding of the nature and advantages of the present invention, reference should be made to the following detailed description taken together with the accompanying figures.

BRIEF DESCRIPTION OF THE DRAWING

FIG. 2 is a schematic sectional view of the dual-layer perpendicular magnetic recording disk with a laminated underlayer according to the first embodiment present invention.

FIGS. 3A–3B are schematic representations of the first embodiment of the present invention, showing a generally circumferential segment of the disk with the radially-oriented magnetic moment vectors of the ferromagnetic layers in the laminated underlayer in the absence (FIG. 3A) and presence (FIG. 3B) of an applied field H from the write head.

FIGS. 5A–5B are schematic representations of the second embodiment of the present invention, showing a generally circumferential segment of the disk with the circumferentially-oriented magnetic moment vectors of the ferromagnetic layers in the laminated underlayer in the presence of a write field less than a critical value (FIG. 5A) and in the presence of a write field greater than a critical value (FIG. 5B).

DETAILED DESCRIPTION OF THE INVENTION

Figure 1:
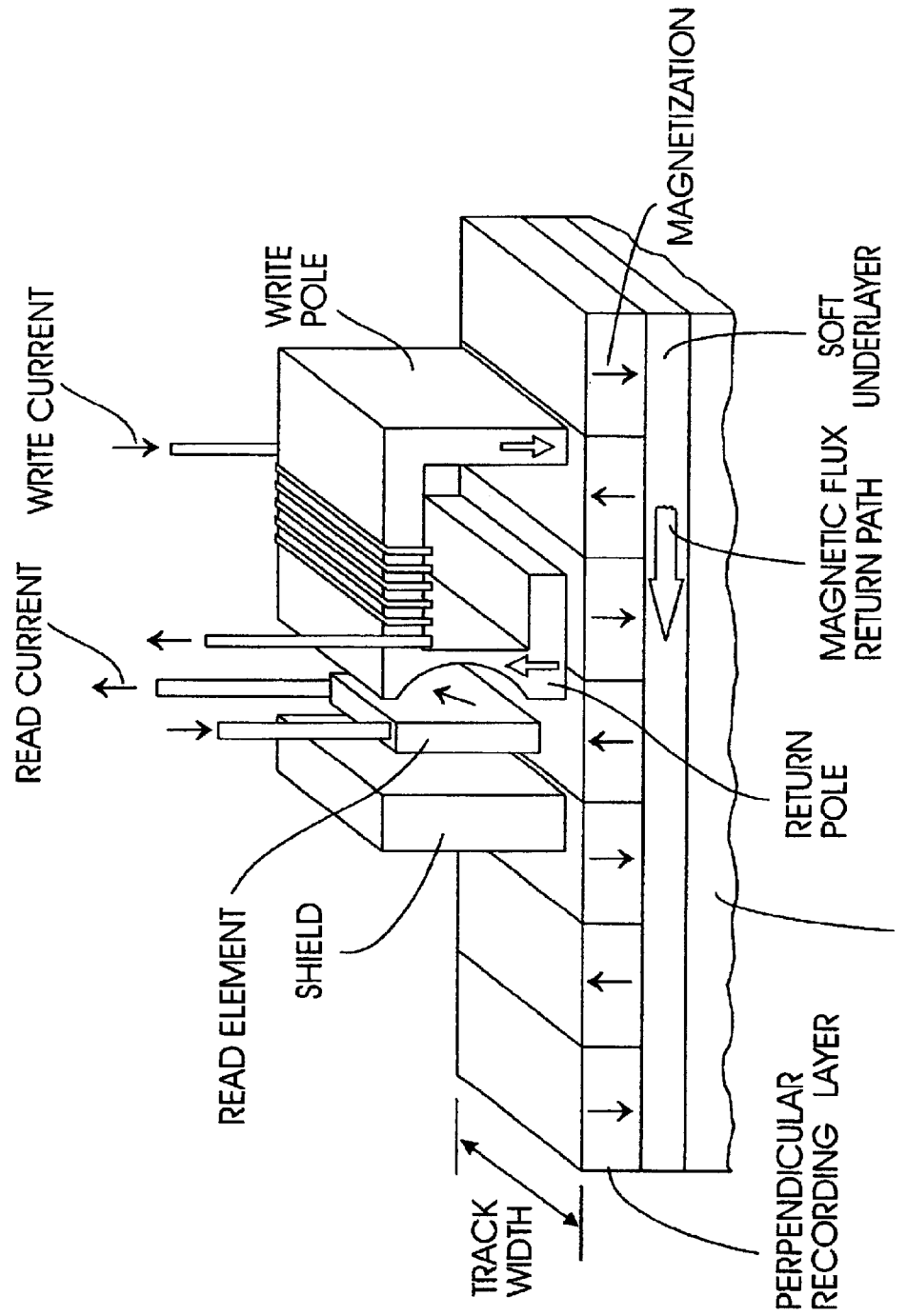
FIG. 1 is a schematic of a prior art perpendicular magnetic recording system comprising a dual-layer disk (i.e., a perpendicular magnetic data recording layer formed on a "soft" magnetically permeable underlayer), a single pole write head and a read element.

The structure of the first embodiment of the disk according to the invention is shown in the schematic sectional view of FIG. 2. The disk has a laminated underlayer 10 of the form FM/AFC/FM/AFC/FM . . . , where FM represents a ferromagnetic layer and AFC represents a nonmagnetic antiferromagnetic coupling layer, e.g., Ru, that is known to promote and mediate an antiferromagnetic (AF), or antiparallel (AP), exchange coupling between adjacent FM layers. There are four FM layers 11, 12, 13, 14 and three spacer layers 21, 22, 23 shown in FIG. 2, but more or fewer pairs of FM layers could be used. The magnetic moments or magnetization directions of the FM layers are depicted by the vector heads and tails 31, 32, 33, 34 in FIG. 2 and are oriented radially, i.e., perpendicular to the circumferential track direction. The bottom FM layer 11 has its magnetic moment biased by a biasing layer 40, which can be an antiferromagnetic (AF) pinning layer exchange coupled with the bottom FM layer 11, or by a hard magnetic layer, such as a layer of CoPtCr alloy. Also shown by the double arrow in FIG. 2 is the direction of flux through the laminated underlayer from the write field generated by the write pole.

The antiferromagnetic coupling of ferromagnetic films via a nonferromagnetic transition metal spacer film has been extensively studied and described in the literature. In general, the exchange coupling oscillates from ferromagnetic to antiferromagnetic with increasing spacer film thickness. This oscillatory coupling relationship for selected material combinations is described by Parkin et al. in "Oscillations in Exchange Coupling and Magnetoresistance in Metallic Superlattice Structures: Co/Ru, Co/Cr and Fe/Cr", *Phys. Rev. Lett.*, Vol. 64, p. 2034 (1990). The material combinations include ferromagnetic films made of Co, Fe, Ni, and their alloys, such as Ni—Fe, Ni—Co, and Fe—Co, and nonferromagnetic spacer films such as ruthenium (Ru), chromium (Cr), rhodium (Rh), iridium (Ir), copper (Cu), and their alloys. For each such material combination, the oscillatory exchange coupling relationship has to be determined, if not already known, so that the thickness of the nonferromagnetic spacer film is selected to assure antiferromagnetic coupling between the two ferromagnetic films. The period of oscillation depends on the nonferromagnetic spacer material, but the strength and phase of the oscillatory coupling also depends on the ferromagnetic material and interfacial quality. The oscillatory antiferromagnetic coupling of ferromagnetic films has been used in spin-valve type giant magnetoresistance (GMR) recording heads to design continuous magnetized antiferromagnetically coupled films whose magnetic moments are rigidly coupled together antiparallel during operation of the head. These type of spin-valve structures are described, for example, in IBM U.S. Pat. Nos. 5,408,377 and 5,465,185.

Referring to FIG. 3A, for a laminated underlayer with four FM layers, the series of vectors 31, 32, 33, 34 represent the magnetizations of the four FM layers 11, 12, 13, 14, respectively, in the quiescent state (no applied write field H), with 31 and 34 representing the layers closest and farthest from the write head, respectively. (In FIGS. 3A–3B the magnetization vectors 31, 32, 33, 34 are shown spaced circumferentially for ease of explanation; however, these vectors would actually be on top of one another since the views of FIGS. 3A–3B are downward onto a circumferential segment of the disk representing a portion of a data track). In FIG. 3B the field H represents, for example, the primarily circumferential, in-plane component of the write field from the head, which drives flux in the underlayer to flow between the write pole and the return pole (see FIG. 1) of the write head. The vectors in FIG. 3B represent the same magnetizations when the FM layers carry a substantial degree of write flux from the write pole. Because the alternate FM layers have antiparallel magnetic moments or magnetization directions, as shown by the vector heads and tails in FIG. 2, their combined flux conduction shows no re-orientation of the mean flux path even at large write flux levels, as illustrated in FIG. 3B. Because the AF coupling mechanism has no intrinsic directional orientation, the magnetic moment orientations of AF-coupled FM layers will, for large enough fields H, naturally align themselves this way with respect to the H field vector regardless of its direction.

The AP interfacial coupling strength between any two ferromagnetic layers, $J_{ap}$, can readily be several times greater than the exchange coupling strength between the pinning AF layer and the bottom FM layer, $J_{ex}$, obtainable using practical FM/AF couples. (The magnitude of $J_{ap}$ can also be adjusted through a combination of thickness of the spacer layers, $t_{ap}$, and composition variation, e.g., alloying of Ru or with other AP coupling layers such as Rh or Cr.) Because the interior FM layers are AP-coupled to each other across two interfaces, the effective AP coupling field seen by each (interior) FM layer, $H_{ap}=4*J_{ap}/(M_s*t_{fm})$, is twice that for FM/AF laminations even if $J_{ex}=J_{ap}$. Hence even for a moderate value of $J_{ap}=0.3$ erg/cm$^2$ for CoFe/Ru/CoFe, a value of $H_{ap}=100$ Oe can be achieved, using a relatively thick $t_{CoFe}$~100 nm layer. Further, the thicknesses $t_{ap}$ of AP coupling layers (e.g., Ru) are very thin, typically ~1 nm. As a result, one can design FM/AP multilayers where the thickness ratio $t_{fm}/t_{ap}$~100, and essentially eliminate permeability anisotropy for perpendicular flux-flow. Combined with thicker $t_{fm}$, this will eliminate, or radically reduce, the problem of upper FM laminate saturation, yielding roughly equal write flux levels in all lower FM layers.

With the laminated underlayer of the present invention as described above, the only intrinsic mechanism to provide a preferential, nominally radial alignment (perpendicular to the circumferential track direction) of the quiescent FM magnetization vectors, as depicted in FIG. 3A, is induced anisotropy. This anisotropy can be obtained as a consequence of residual radial fields from the magnetrons in a sputtering system. Alternatively, the laminated underlayer can be annealed in the presence of a radially directed magnetic field subsequent to deposition. To further strengthen the preference for a unique direction (inward or outward) of radial alignment, the FM/AFC/FM laminates can be deposited on top of a biasing layer, such as an AF pinning layer, which is in direct contact with, and exchange coupled to the bottom FM layer. This pinning layer is depicted as item 40 in the embodiment of FIG. 2 and biases the magnetization direction of the bottom FM layer 11 in the radial direction. Suitable AF materials include FeMn, NiMn, PtMn, IrMn, PdPtMn and NiO. The structure can then be annealed again in a radially oriented magnetic field of strength exceeding $H_{ap}$, for example in a permanent magnet fixture. In this structure, the lower FM layer will see an additional effective radial exchange pinning field $$H_{pin}=J_{ex}/(M_s*t_{fm-bot}),$$

where $t_{fm-bot}$ is the thickness of the bottom FM laminate. Since this interaction occurs at only one interface, and $J_{ex}<J_{ap}$ typically, the induced alignment due to $H_{pin}$ will have relatively weak influence (compared to $H_{ap}$) on the upper laminates. As an alternative to the AF pinning layer, a layer of hard magnetic material, such as a CoPtCr alloy, can used beneath the bottom FM layer to bias its magnetic moment.

Because the top and bottom FM layers are AF coupled across only one interface, instead of two interfaces as are all the interior FM layers, their magnetic moments will otherwise rotate twice as readily in response to the write field H. The strong AF coupling between FM layers can then cause an oscillatory amplitude of flux conduction throughout the FM/AF/FM . . . laminated underlayer, rather than the desired uniform amplitude of flux conduction in all FM layers. Because exchange coupling is interfacial in nature, and the effective AF coupling "field" seen by any individual exchange-coupled layer scales as 1/thickness, this problem can be essentially eliminated by proper control of the end lamination thicknesses, $t_{fm-bot}$ and $t_{fm-top}$, relative to the thickness $t_{fm}$ (assumed uniform) of all the interior layers. For a laminated underlayer with three or more FM layers, the following thickness relationships may be selected:

$t_{fm-top}/t_{fm} = \frac{1}{2}$ for the top FM layer, and $t_{fm-bot}/t_{fm} = \frac{1}{2} + J_{pin}/(4*J_{ap})$ for the bottom FM layer.

The bottom FM layer may be exchange pinned to the AF pinning layer as discussed previously. Such appropriate selection of the thicknesses will make all FM layers, including those on top and bottom, respond with equal amplitude of moment rotation in response to a uniform strength field H. In the special case of only two FM layers (i.e., a single pair or laminate), the thickness selection would be $t_{fm-bot} = t_{fm-top} = t_{fm}$, although in this example $H_{ap} = 2*J_{ap}/(M_s*t_{fm})$ is only half as strong as for the general case of three or more FM layers.

The number and thickness of the FM layers is also selected to magnetically match the thickness of the write pole to ensure that there is adequately low reluctance to conduct the flux from the write head in the underlayer. The combined thickness of all the FM layers in the underlayer is preferably in the range of 200 nm to 1000 nm. Thus each FM layer has a thickness is in the range of 200 nm/N to 500 nm/N, where N is the number of FM layers. The thickness of each FM layer can be as small as about 20 nm and as large as about 200 nm.

Figure 4:
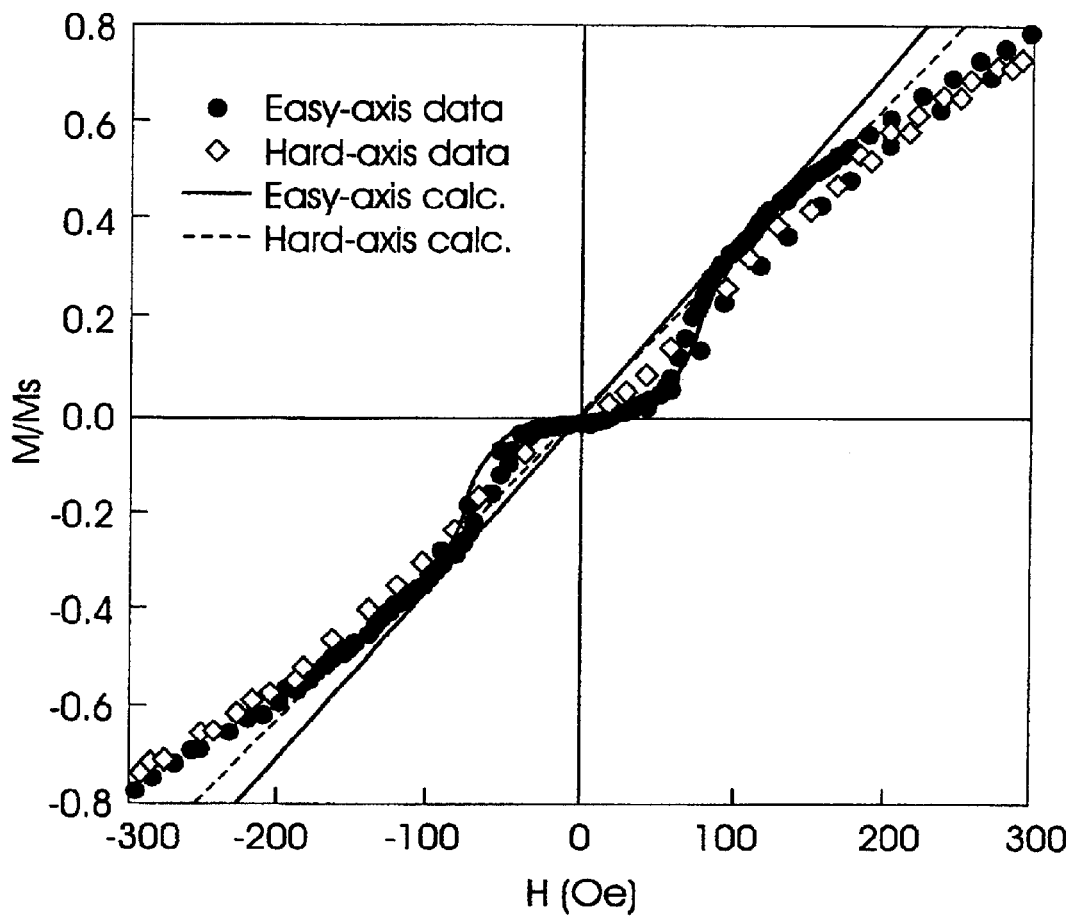
FIG. 4 is a M-H hysteresis loop of a structure representative of the laminated underlayer of the first embodiment of the present invention, i.e., $IrMn/\{CoFe/Ru\}_4/CoFe$ with five CoFe ferromagnetic layers, four Ru spacer layers, and a bottom IrMn antiferromagnetic layer.

FIG. 4 shows M-H loops for an IrMn/{CoFe/Ru}$_4$/CoFe laminated underlayer with five CoFe FM layers. Layer thicknesses are $t_{CoFe}$=50 nm, $t_{Ru}$=0.7 nm, along with $t_{CoFe-bot}$=28 nm, and $t_{CoFe-top}$=25 nm. Other measured magnetic parameters include $H_k$=20 Oe and $J_{pin}$=0.15 erg/cm for IrMn/CoFe. The M-H loops for both hard-axis (e.g., circumferential) and easy-axis (e.g., radial) oriented fields H are shown. For moderate flux levels of $M/M_s$<0.8, the data can be reasonably well fit by micromagnetic simulations using the single fitting parameter $H_{ap}$=300 Oe, corresponding to $J_{ap}$=0.54 erg/cm$^2$. The measured M-H loops show virtually zero remanence, and have well defined hard and easy axes of magnetization. In particular, the hard-axis loop shows near ideal linear behavior for small to moderate H fields, where the data is well described by the simple relation $M/M_s = H/(H_k + H_{ap})$. In contrast, the easy-axis loop shows rather limited $M/M_s$ response for smaller H-fields<~70 Oe (sqrt($H_k*H_{ap}$), as predicted by theory, where the FM layer magnetizations remain parallel or antiparallel to the applied field. However, at larger fields where AP coupling dominates over anisotropies, the FM layer magnetization vectors orient themselves to the H-field, as shown in FIG. 3B, and easy and hard-axis loops become very similar. For this particular laminated underlayer of total magnetic thickness of 200 nm, $\mu_{rot} = B_s(H_k + H_{ap})$ approximately equal to 60, as compared to $\mu_{rot} = B_s/(H_k + H_{pin})$ approximately equal to 700 as achieved by a single laminate IrMn/CoFe with $t_{CoFe}$=200 nm (not shown). This demonstrates the ability of the present invention to control permeability over a wide range. Somewhat more optimal values of $H_{ap}$ approximately equal to 100 Oe and $\mu_{rot}$ approximately equal to 100–200 can be obtained, e.g., by increasing $t_{CoFe}$ to 100–150 nm, and/or increasing $t_{Ru}$ somewhat to weaken the coupling strength $J_{ap}$, as described by previous formulae for these quantities.

Thus in a preferred embodiment of the disk shown in the FIG. 2, the substrate would be any conventional disk substrate, such as glass and Al—Mg with a NiP surface coating. The AF pinning layer 40 is IrMn of 10 nm thickness. A seed layer (not shown), such as Cu, may be located between the substrate and the AF pinning layer 40. The bottom FM layer 11 is CoFe of 25 nm thickness, and the top FM layer 14 is CoFe of 25 nm thickness. The interior FM layers 12, 13 are each 50 nm thick CoFe, and the spacer layers 21, 22, 23 are formed of Ru with a thickness of 0.7 nm selected to provide the strongest AF coupling between the CoFe FM layers. In addition to CoFe, other magnetically permeable materials suitable for the FM layers are alloys of CoNiFe, FeCoB, CoCuFe, NiFe, FeAlSi, FeTaN, FeN, FeTaC, CoTaZr, CoFeB, and CoZrNb.

Also, thin films of ferromagnetic material can be added at the interface between the FM layers and the AFC spacer layer to enhance the exchange coupling. For example, a 5 Å Co film at the interfaces will enhance the coupling.

In the preferred embodiment, a 5 nm nonmagnetic titanium (Ti) exchange break layer 50 is located on top of the uppermost FM layer 14, as shown in FIG. 2. The Ti layer acts to break the magnetic exchange coupling between the magnetically permeable films of the underlayer and the perpendicular magnetic recording data layer and also serves to facilitate epitaxial growth of the perpendicular magnetic recording data layer. The exchange break layer may not be necessary but if used can be, in addition to Ti, a non electrically conducting spacer layer material such as Si, Ge and SiGe alloys; a metal such as Cr, Ru, W, Zr, Nb, Mo, V and Al; a metal alloy such as amorphous CrTi and NiP; an amorphous carbon such as $CN_x$, $CH_x$, C; or oxides, nitrides or carbides of an element selected from the group consisting of Si, Al, Zr, Ti, and B.

The perpendicular magnetic data layer 60 formed on top of the laminated underlayer is preferably a 15 nm thick layer of granular polycrystalline cobalt alloy. The perpendicular magnetic data layer can be any of the known amorphous or crystalline materials and structures that exhibit perpendicular magnetic anisotropy. These include granular polycrystalline perpendicular films and multilayers, such as Co—Pt, Co—Pd, Fe—Pt and Fe—Pd multilayers. In addition, perpendicular magnetic data layers containing rare earth elements are useable, such as CoSm, TbFe, TbFeCo, GdFe alloys.

The first embodiment of the present invention described above has the magnetic moments or magnetization vectors of all the FM layers in the laminated underlayer oriented generally radially in the quiescent state, i.e., in the absence of a write field. Such radial alignment is necessary during the writing process, so as to promote a high permeability flux return path from the write pole to the return pole in the downtrack or circumferential direction. It is well known that this effect of the soft underlayer also increases the readback signal from the perpendicular media recording layer. However, this effect on the readback signal occurs primarily at low recording density where the signal-to-noise ratio is naturally large. In contrast, due to well known spacing-loss effects, the soft underlayer provides little or no gain in signal-to-noise ratio at high recording density where the readback signals are naturally the smallest, and which ultimately limits what is the achievable areal recording density for the system. It is possible that the gain in low density signal strength afforded by the soft underlayer may overdrive the read sensor into nonlinear behavior. This problem would not occur if the soft underlayer could be made to be effective only during the writing process. One alternative embodiment of the present invention which can accomplish this is to use the bias layer to nominally align the magnetization vectors of the AF coupled laminates to be oriented substantially in the circumferential or track direction. This is suggested by the data of FIG. 4, and is further illustrated in FIGS. 5A–5B. As described earlier, a now easy-axis, circumferential field H applied parallel to the quiescent orientation of the magnetization vectors 71, 72, 73, 74 of the AF coupled laminates, will not, if smaller than a critical field $H_{crit}$, induce an appreciable magnetization rotation, and the M-H loops are essentially flat, as though the laminate was "absent" magnetically. However, for sufficiently large fields H>$H_{crit}$, the orientation of all the magnetization vectors of the strongly AF coupled laminates will undergo a "spin-flop", and automatically align themselves approximately perpendicular to the field H, as depicted by FIG. 5B, resembling hard axis linear M-H loops behavior shown in FIG. 4. It is known in general that the recording layer external signal fields $H_{sig}$, are much smaller than the field $H_{rec}$ that the underlayer sees from the write head during the writing process, i.e., $H_{sig}<<H_{rec}$. Hence, by adjusting $H_{crit}$ via any combination of $H_k$, $H_{ap}=J_{ap}/(M_s*t_{fm})$, and/or $H_{pin}$ such that $$H_{sig}<H_{crit}<H_{rec},$$

the flux return action of the AF coupled laminated underlayer of this second embodiment can be limited to the writing process only. Similarly to the previous embodiments, the AF-coupling between laminates would serve to eliminate the occurrence of domain walls in the soft underlayer during readback.

Using either an AF exchange coupling layer or an FM biasing layer, the circumferential orientation of the quiescent magnetizations of the FM laminates may be achieved in an analogous technique as described above for the embodiment with the radially oriented magnetizations.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording disk comprising:
   a substrate;
   a layer of antiferromagnetic material on the substrate;
   a laminated underlayer on the substrate, the underlayer comprising N ferromagnetic layers and N-1 nonferromagnetic spacer layers, wherein N is greater than 2, each of the spacer layers being located between and in contact with two adjacent ferromagnetic layers, a first of the N ferromagnetic layers being located on and in contact with the layer of antiferromagnetic material and having its magnetic moment pinned in a preferred direction by being exchange biased with said antiferromagnetic material, each of the spacer layers having a thickness sufficient to induce antiferromagnetic exchange coupling across said adjacent ferromagnetic layers, whereby the magnetic moments of adjacent ferromagnetic layers are oriented generally antiparallel in the absence of an applied magnetic field;
   a magnetic recording layer of material having perpendicular magnetic anisotropy on the laminated underlayer; and
   wherein the ferromagnetic layers in the underlayer other than the ferromagnetic layer in contact with the layer of antiferromagnetic material and the ferromagnetic layer nearest the magnetic recording layer have substantially the same thickness $t_{fm}$, wherein the ferromagnetic layer nearest the magnetic recording layer has a thickness $t_{top}$ and wherein $(t_{fm}-t_{top})/t_{fm}$ approximately equals ½.

2. The disk of claim 1 further comprising an exchange break layer between the underlayer and the magnetic recording layer for preventing magnetic exchange coupling between the ferromagnetic layers of the laminated underlayer and the magnetic recording layer.

3. The disk of claim 2 wherein the exchange break layer is formed of material consisting essentially of titanium.

4. The disk of claim 2 wherein the exchange break layer is formed of material selected from the group consisting of Si, Ge, SiGe alloys, Cr, Ru, W, Zr, Nb, Mo, V, Al, CrTi, NiP, $CN_x$, $CH_x$, C, and oxides, nitrides and carbides of an element selected from the group consisting of Si, Al, Zr, Ti, and B.

5. The disk of claim 1 wherein the ferromagnetic layers of the underlayer are formed of an alloy comprising cobalt and iron.

6. The disk of claim 5 wherein the cobalt-iron alloy includes an element selected from the group consisting of nickel, boron and copper.

7. The disk of claim 1 wherein the ferromagnetic layers of the underlayer are formed of a material selected from the group consisting of alloys of CoFe, CoNiFe, NiFe, FeCoB, CoCuFe, FeAlSi, FeTaN, FeN, FeTaC, CoTaZr and CoZrNb.

8. The disk of claim 1 wherein the spacer layers of the underlayer are formed of a material selected from the group consisting of ruthenium (Ru), chromium (Cr), rhodium (Rh), iridium (Ir), copper (Cu), and their alloys.

9. The disk of claim 8 wherein the spacer layers of the laminated underlayer are formed of Ru.

10. The disk of claim 1 wherein the antiferromagnetic material is a material selected from the group consisting of FeMn, NiMn, PtMn, IrMn, PdPtMn and NiO.

11. The disk of claim 1 wherein the magnetic moments of the ferromagnetic layers in the underlayer are oriented generally radially on the disk.

12. The disk of claim 1 wherein the magnetic moments of the ferromagnetic layers in the underlayer are oriented generally circumferentially on the disk.

13. A perpendicular magnetic recording disk having a generally circular shape and comprising:
    a substrate;
    a layer of antiferromagnetic material on the substrate;
    a laminated underlayer on the substrate, the underlayer comprising N ferromagnetic layers and N-1 nonferromagnetic spacer layers, wherein N is greater than 2, each of the spacer layers being located between and in contact with two adjacent ferromagnetic layers, a first of the N ferromagnetic layers being located on and in contact with the layer of antiferromagnetic material and having its magnetic moment pinned in a generally radial direction by being exchange biased with said antiferromagnetic material, each of the spacer layers having a thickness sufficient to induce antiferromagnetic exchange coupling across said adjacent ferromagnetic layers, whereby the magnetic moments of adjacent ferromagnetic layers are oriented generally antiparallel in the absence of an applied magnetic field, said magnetic moments being aligned in a generally radial direction on the disk in the absence of an applied magnetic field;
    a magnetic recording layer of material having perpendicular magnetic anisotropy on the laminated underlayer; and
    wherein the ferromagnetic layers in the underlayer other than the ferromagnetic layer in contact with the layer of antiferromagnetic material and the ferromagnetic layer nearest the magnetic recording layer have substantially the same thickness $t_{fm}$, wherein the ferromagnetic layer nearest the magnetic recording layer has a thickness $t_{top}$ and wherein $(t_{fm}-t_{top})/t_{fm}$ approximately equals ½.

14. The disk of claim 13 further comprising an exchange break layer between the laminated underlayer and the magnetic recording layer for preventing magnetic exchange coupling between the ferromagnetic layers of the laminated underlayer and the magnetic recording layer.

15. The disk of claim 14 wherein the exchange break layer is formed of material consisting essentially of titanium.

16. The disk of claim 14 wherein the exchange break layer is formed of material selected from the group consisting of Si, Ge, SiGe alloys, Cr, Ru, W, Zr, Nb, Mo, V, Al, CrTi, NiP, $CN_x$, $CH_x$, C, and oxides, nitrides and carbides of an element selected from the group consisting of Si, Al, Zr, Ti, and B.

17. The disk of claim 13 wherein the ferromagnetic layers of the laminated underlayer are formed of an alloy comprising cobalt and iron.

18. The disk of claim 17 wherein the cobalt-iron alloy includes an element selected from the group consisting of nickel, boron and copper.

19. The disk of claim 13 wherein the ferromagnetic layers of the laminated underlayer are formed of a material selected from the group consisting of alloys of CoFe, CoNiFe, NiFe, FeCoB, CoCuFe, FeAlSi, FeTaN, FeN, FeTaC, CoTaZr and CoZrNb.

20. The disk of claim 13 wherein the spacer layers of the laminate underlayer are formed of a material selected from the group consisting of ruthenium (Ru), chromium (Cr), rhodium (Rh), iridium (Ir), copper (Cu), and their alloys.

21. The disk of claim 13 wherein the spacer layers of the laminated underlayer are Ru.

22. The disk of claim 13 wherein the antiferromagnetic material is a material selected from the group consisting of FeMn, NiMn, PtMn, IrMn, PdPtMn and NiO.

* * * * *